United States Patent
Hilscher

(10) Patent No.: US 8,065,455 B2
(45) Date of Patent: Nov. 22, 2011

(54) METHOD FOR DATA COMMUNICATION OF BUS USERS IN AN OPEN AUTOMATION SYSTEM

(75) Inventor: Hans Jürgen Hilscher, Hattersheim (DE)

(73) Assignee: Hilscher Gesellschaft für Systemautomation mbH, Hattersheim (DE)

( * ) Notice: Subject to any disclaimer, the term of this patent is extended or adjusted under 35 U.S.C. 154(b) by 554 days.

(21) Appl. No.: 11/922,395

(22) PCT Filed: Sep. 25, 2005

(86) PCT No.: PCT/EP2005/010348
§ 371 (c)(1),
(2), (4) Date: Dec. 18, 2007

(87) PCT Pub. No.: WO2006/136201
PCT Pub. Date: Dec. 28, 2006

(65) Prior Publication Data
US 2009/0119437 A1    May 7, 2009

(30) Foreign Application Priority Data

Jun. 23, 2005 (DE) .......................... 10 2005 029 654
Jun. 23, 2005 (DE) .......................... 10 2005 029 655
Jun. 23, 2005 (DE) .......................... 10 2005 029 656

(51) Int. Cl.
*G06F 13/00* (2006.01)
(52) U.S. Cl. ...................... 710/104; 710/307
(58) Field of Classification Search .................. 710/107, 710/305, 104, 307
See application file for complete search history.

(56) References Cited

U.S. PATENT DOCUMENTS 5,740,142 A * 4/1998 Nishiyama et al. ......... 369/59.27
5,784,636 A * 7/1998 Rupp ............................. 712/37
5,988,846 A   11/1999 Flamm
(Continued)

FOREIGN PATENT DOCUMENTS
DE    102 58 469    7/2004

OTHER PUBLICATIONS

Beikirch H. et al. "Smart field bus nodes with programmable sensor interfaces", Emerging Technologies and Factory Automation, 2001. Proceedings. 2001 8 TH IEEE International Conference on Oct. 15-18, 2001, Piscataway, NJ, IEEE, vol. 2, Oct. 15, 2001. pp. 683-686.

(Continued)

*Primary Examiner* — Mark Rinehart
*Assistant Examiner* — Nimesh G Patel
(74) *Attorney, Agent, or Firm* — Rankin, Hill & Clark LLP

(57) ABSTRACT

A method for data communication of bus users of an open automation system such that any bus user with an individual and interactive communication may be connected provides for a communication controller (KC) made up of at least one freely-programmable communication-ALU (RPA, TPA, PEA), with several commands being encoded on a command code for the communication-ALU optimized for particular communication functions, and logic function blocks (FI, Z, V, CRC) are arranged in parallel in the communication ALU (RPA, TPA), which carry out particular communication functions, the communication functions not being definitively defined but rather being formed on the basis of the freely-programmable and communication function optimized communication ALUs (RPA, TPA, PEA), wherein several commands are carried out in a system cycle and transitions between various networks can be carried out.

19 Claims, 7 Drawing Sheets

U.S. PATENT DOCUMENTS

| | | | | |
|---|---|---|---|---|
| 6,631,466 | B1 * | 10/2003 | Chopra et al. | 712/300 |
| 7,434,192 | B2 * | 10/2008 | van Wageningen et al. | 716/16 |
| 7,546,444 | B1 * | 6/2009 | Wolrich et al. | 712/228 |
| 2001/0014833 | A1 | 8/2001 | Brault | |
| 2002/0095612 | A1 | 7/2002 | Furhrer | |
| 2005/0253857 | A1 * | 11/2005 | Hutchins et al. | 345/506 |

OTHER PUBLICATIONS

Willmann P. et al. "An Efficient Programmable 10 Gigabit Ethernet Network interface Card", High-Performance Computer Architecture, 2005. HPCA-11. 11TH International Symposium on San Francisco, CA, USA Feb. 12-16, 2005, Piscataway, NJ, USA, IEEE, Feb. 12, 2005, pp. 96-107.

Valdes M.D. et al. "Configurable interfaces oriented to microprocessor-based control system", Industrial Electronics Societey, 1998. IECON '98. Proceedings of the 24TH Annual Conference of the IEEE Aachen, Germany Aug. 31-Sep. 4, 1998, New York, USA, IEEE, US, vol. 3, Aug. 31, 1998, pp. 1653-1656.

Hosek, M. "Clustered-architecture motion control system utilizing IEEE 1394b communication network", American Control Conference, 2005. Proceedings of the 2005 Portland, OR, USA, Jun. 8-10, 2005. Piscataway, NJ, ASA, IEEE, Jun. 8, 2005, pp. 2939-2945.

* cited by examiner

METHOD FOR DATA COMMUNICATION OF BUS USERS IN AN OPEN AUTOMATION SYSTEM

This application is the national stage of PCT/EP2005/010348 filed on Sep. 25, 2005 and also claims Paris Convention priority to DE 10 2005 029 656.4 filed on Jun. 23, 2005 and DE 2005 029 654.8 filed on Jun. 23, 2005 and DE 2005 029 655.6 filed on Jun. 23, 2005.

BACKGROUND OF THE INVENTION

The present invention primarily relates to a method for data communication, in particular for coupling bus users of an open automation systems, and a freely programmable communication processor according to the independent claims. Furthermore the present invention relates to a method for data communication, in particular for D11 configuration, and an apparatus with a flexible communication structure, in particular a programmable controller. Finally the present invention relates to a method and a device for data communication, in particular for synchronization of communicating among each other bus users of an automation system with distributed control functions over a serial data bus.

Already for a longer time in the control and automation technology field busses and Ethernet are used, in particular the extension regarding Real-Time Ethernet for data communication between individual units being involved in controlling a process. Examples for known field busses are CAN-Bus, profibus, modbus, DeviceNet or Interbus. The communication of the units is carried on the field bus/Ethernet on the basis of specified protocols. In order to comply with demands for open systems for networking, it is necessary to provide simple and low-cost systems for networking in order to make industrial appliances capable for networking. This demand is particularly important with respect to coupling drive components, such as between drive controls, power units and transmitters in NC machine tools and robots, regarding which a plurality of interpolating axles have to be operated synchronously. In times of increasing networking of most different technical systems the demand for standardized structures in the industry grows accordingly.

One example for this requirement is the field bus according to the so-called Actuator-Sensor-Interface-standard, in short ASI-standard. This field bus concept is specifically designed for making binary sensors or actuators directly bus-capable, which could not be obtained with other field bus systems up to now. An automation system consists of hardware components being connectable to said bus system, in particular motors, sensors, actuators, inter alia—that is the process environment—which by acting together with one or more superior controls constitute an automatic production process. The bus master then takes over all tasks being necessary for the processing of the bus operation. As a rule the bus master is separated from the actual control unit for controlling the hardware components.

In order to easily obtain an open and flexible operating mode of the system, wherein the hardware components may be exchanged without changing the control programs, in DE 198 50 469 A1 an automation system and a method for accessing the functionality of hardware components is disclosed, wherein as a mapping of the current functionality of hardware components these provide a system connection unit with function objects each, wherein the function objects are provided for accessing the functionality of the hardware components over the bus system. In order to implement the hardware components as "plug and play" modules it is necessary to provide a special function block directly placed in the hardware component, on which the function objects are operable giving access to the functionality of the hardware components. This special function block is implemented in the form of the system connection unit. This system connection unit is coupled to a bus system of the automation system such that for example communication data can be transmitted from a management system to the hardware component as well as from and to all further components coupled to the bus system. By the system connection unit thus it is possible to substitute or to add, etc., hardware components without changing existing structures of the automation system. Furthermore special node elements, which were required up to now between the management system and the hardware components, can be left out. For a network transition the system connection unit provides a memory for storing protocols required between both bus systems. Thus in a very simple way a network transition between ETHERNET (data transfer rate 10 Mbit/s), in particular the FAST ETHERNET (data transfer rate 100 Mbit/s—standard IEEE Std. 802.3-1998), and the profibus may be obtained. The embedding of the system connection units assigned to the hardware components in their environment may be designed such, that the function objects comprise at least one first function object for generating a minimal functionality of one hardware component, at least one second function object for interconnecting function objects and at least one third function object for listing function objects provided in the system processing unit and/or in removed system processing units and/or in removed computers. The particular function of the function objects is to enumerate, i.e. to enquire the functionality sum of the system. For example the function objects are designed as so-called DCOM-objects (Distributed Component Object Model) or as so-called OLE-objects (Object Linking and Embedding). Furthermore the system connection unit provides a runtime-system as well as a protocol-processing unit (Profibus, UDP/IP, RPC). Therefore the system connection unit represents a standard module, which has to provide protocols specified for the field bus, and which is often quite complex and therefore relatively expensive.

In order to allow a fail-safe communication of units involved in a safety-critical process, wherein at the same time the use of standard modules as bus masters is permitted, in DE 199 28 517 C2 a management system is disclosed, wherein the bus master is connected to the field bus separately from a first control unit and a signal unit, wherein the first control unit is arranged upstream of a signal unit with respect to a circulation direction of the telegram traffic, and wherein the first control unit provides means to substitute telegram data being addressed to the signal unit with fail-safe telegram data. It is then possible to connect said first control unit as a simple bus user, i.e. without a bus master functionality, to the field bus. Furthermore the control system provides a second control unit to control non-safety-critical processes, being connected to said field bus separately from said first control unit. Apart from other already known components the second control unit provides a micro controller as well as a master-protocol-chip. In the present case the master-protocol-chip provides a bus master functionality for an interbus and is named "bus master". Such master-protocol-chips are obtainable as standard modules from different manufacturers. A communication module contained in the first control unit provides a slave-protocol-chip being connected to the field bus on the input side via a first bus interface and via a second bus interface on the output side. The protocol chip corresponds to the protocol chips contained in signal units, which connect safety-relevant devices to the field bus as bus users. In order to provide a slave-to-slave communication between bus users in a field bus with sequentially circulating telegram traffic, wherein no bus user has a bus master functionality, the protocol chip of a bus user, which intends to send data to other bus users, will be supplemented with a transmitting memory and if applicable with a receive memory. The operating principle of the circulating telegram traffic is accordingly based on the arranged in the same way slave-protocol-chip in each bus user, often named as "Serial Microprocessor Interface" (SUPI). Because of using a standard module obtainable from different manufacturers, the cost for a control system may be kept low; altogether the cost for the bus master and the signal units, which have to provide specified protocols for the field bus, are complex and relatively high.

A similar solution is disclosed in DE 299 07 909 U1 with respect to a tracking system implemented in a production system based on plug-in boards. In detail each plug-in board provides a microprocessor, a memory unit storing process data and being connected to said microprocessor, a sensor bus interface (RS 485) and a field bus interface (RS 485) both being connected to said microprocessor, a service interface (RS-232) for connection to a modem and an interface (ISA-bus interface) for connecting the microprocessor to a host computer. The integrated field-bus interface, or the sensor bus interface, each provide an ISO-interface and a field bus data processor (SPC 3), in the present example a profibus-data-processor. A machine control is optionally connected to the plug-in board via the integrated profibus interface or to sensor-electronic units via an II/O-box. The intelligent sensor-electronic-units each allow the supply of one sensor, the collection of sensor data, the pre-processing of measuring signals (signal filtering, signal amplification, etc.) and the simple signal analysis (digital filtering, collecting peak values, etc.). Therefore an intelligent sensor-electronic-unit implies being a module providing an own micro-controller, filter, amplifier, power supply and a sensor bus interface. The sensor-electronic-unit may be newly parameterized via the plug-in board before each processing. This concerns for example the amplification factors, the filtering values and the clearing of several input signals to one sum signal. By the profibus interface the monitoring may be synchronized to the processing operation. Via so-called automated setting routines the monitoring system may be easily implemented in the production appliance. The automated setting routines for example perform the speech perception on the controller and the connected to it speech switching, the recognition of the sensors on the sensor bus and the automatic configuration of the amplification and filter values. The inputs and outputs of the programmable logic controller (SPS) are assigned automatically and the time of a real time clock on the plug-in board will be automatically coordinated with the time of the host computer. The plug-in board allows to monitor for example up to four sensor channels, wherein for the sensor bus interface a data rate up to 460.8 kBaud, at the same time having a high interference immunity, may be obtained with the communication processor. Preferably the microprocessor of the plug-in board processes data in Hamming code with a Hamming distance of 4 and carries out the encoding and decoding. Between the microprocessor and the ISA-interface towards the host computer an address decoder is included carrying out the encoding and decoding of address and memory accesses in a PC in a per se known way. The power supply of the plug-in board is carried out via the ISA-interface, across which the communication to the host computer is carried out as well. Because the plug-in board has its own processor being in charge of the monitoring, the CPU of the host computer shall not be reserved for processing power. A real-time capable sensor bus protocol is defined for the communication with the sensor-electronic-units. Thus the enquiry of the measuring data as well as the controlling and parameterizing of the sensors with defined response times is made possible. The monitoring data are processed in a cycle of 10 ms and the pre-processing of sensor data allows a scan frequency below 1 ms. Thus a response time below 1 ms may be guaranteed for a collision monitoring. Beside the synchronization data also process specific axle signals can be transmitted via the field—or the profibus in a preferable way like torques, motor currents and axle speeds. The protocol allows for example the enquiry of up to eight different axles. Via the field bus the required control data can also be directly delivered out of the control core of the machine control to the microprocessor of the plug-in board. In this case no specific sensor technology is needed and the sensor bus interface on the plug-in board may be left out. Via the service interface all settings, software updates as well as process visualization may be carried out. In case said service interface is designed as a modem interface then teleservice and telediagnostic service functionalities are available via a modem. Accordingly the system becomes fully operable and parameterizable under remote control. The visualization of process data may be performed by a program on the host computer (controller, industry-PC). As the plug-in boards and the intelligent sensor-electronic-units, which have to provide protocols specified for the field bus, are complex and relatively expensive this may be deemed a disadvantage again.

Furthermore in DE 198 31 405 A1 a control system with a personal computer is disclosed, which provides for processing a control program at least one PC-processor, one program memory and one data storage and which provides a communication processor for the connection to a field bus, to which sensors and/or actuators for controlling a process may be connected. For the communication on the field bus a plug-in board is inserted in the PC, which is connected to an internal PCI-bus, which provides data-, control- and address lines. Via a PCI-bus connection and the internal bus the PC-processor communicates with the components of the plug-in board. The communication processor is arranged on the plug-in board and automatically carries out a cyclic data transfer on the field bus after a corresponding parameterization of the PC-processor and mainly consists of an ASIC. The communication processor is operable as a master on a field bus with cyclic data transfer like the PROFIBUS DP and functions as clock source when collecting process data. Further a memory is provided in which process data delivered on the field bus are stored. This memory then stores a current process map, which the PC-processor may access at any time. In order to relieve the PC-processor of the polling of incoming process data or of monitoring the field bus, a control unit is provided. The control unit may be implemented through a hardware circuit being parameterisable, but also through an expansion of the communication processor program in form of a software solution. The hardware circuit then comprises a small RAM being embedded in the address space of the PC-processor and therefore may be directly addressed by the PC-processor and a programmable logic module, which according to a corresponding parameterization stored on the RAM monitors the cyclic data transfer on the field bus and/or incoming data on the field bus. When starting the control program in the program memory the PC processor accesses the RAM and sets the corresponding bits therein, thus determining the function of the control unit as required. By this parameterization it may be determined for example in which cases the control unit has to generate an interrupt, which is transmitted via the PCI-bus connection and on the PCI-bus to the PC-processor. Thus it may be determined, in which cases the PC-processor shall be prompted by the control program to further process data received on the field bus. In case of active process control the communication processor as a master continually polls all users on the field bus, for example sensors like a flow meter or a level meter converter, actuators like supply or discharge valves in a tank, which are operated as slaves. In case the communication processor read in process data of a slave, it intends to store those in the memory cells of the memory provided for the individual process data. The logic block of the control unit reviews by the address of the write access, if an interrupt has to be generated in case of a change of the individual process data. This review can easily be carried out, because the process data of each slave are stored at fixed memory locations within the memory. If an interrupt has to be generated in case of a particular data change, a data comparator implemented within the logic block compares data put on the bus by the communication processor with previous process data, which previously have been read out of the memory by the logic block. Because the comparison of currently received data to previous process data as well as the interrupt-generation is carried out by a control unit implemented in hardware-form thus a very quick response of the control system to the change of process data is possible in a favorable way. The disadvantage again is that the communication processor and the control unit, which have to provide specified protocols for the field bus, are complex and therefore relatively expensive.

The use of (Fast)-Ethernet transfer technology is also known regarding the networking of different communication systems. For example in DE 100 47 925 A1 a method for the real-time communication between several network users within a communication system with Ethernet-physics is disclosed, wherein a master unit and one or more slave units communicate among each other by transmitted over the network telegrams, a cyclical exchange of telegrams takes place with equidistant sampling points, wherein each slave unit is synchronized to the master unit by a shared time basis and an access control for the transmit and receive mode between the network users is performed by a time slot-access method. In the automation technology the demands on the performance of communication systems are particularly high, for example regarding the coupling of driving components. The data transfer time, in the control loop taken into account as lag time, is an especially important parameter when exchanging data between transmitters, power units and a driving control. The smaller this lag time the higher a dynamic volume can be obtained by the control system. Because in the automation technology a highly accurate compliance with real-time conditions is required as well as a high data transfer safety, the standardized transmitting layer 2 (telegram frame and access method) of the (Fast)-Ethernet, which does not comply with these demands, shall be defined completely new by a new telegram frame and a new access control and with this the Ethernet-physics is used as a basis for a real-time communication between, for example, driving components. The communication between the control unit and the transmitters and the power units as well as the connection to a motion control can then be implemented. In order to obtain a cyclical data transfer with same sampling times, a shared time basis for the master and all slaves is implemented. The synchronization of the slaves to the master is carried out by specifically marked up, time wise defined telegrams of the master sent to the slaves and individually parameterized timing registers within the slaves. The user data can be transmitted on a telegram frame, which provides—beside the slave addressing and the telegram length information—the securing of the data integrity by, for example, a CRC-check sum and further security-related data ranges. An application processor may not only evaluate the data on the telegram frame, but also by a communication block, thus providing a second initiating channel. Although the applied transfer technology according to the Ethernet-standard in principle only permits point-to-point-connections, the establishment of networks can be obtained by using network nodes (so-called HUBs) as used in (Fast)-Ethernet-networks, wherein several or each network user has a switch unit to establish a network node, which serves for the transmission of the telegrams in the direction of another master unit or further slave units. Then also hierarchical networks with point-to-point-connections with Ethernet-physics connected via network nodes can be established for the realization of a real time communication within larger network topologies. This is also useful for a networking or coupling of a distributed driving system, wherein a first communication system comprises a numeric motion control as a master unit and at least one control unit as a slave unit, wherein each control unit serves as a master unit of a further communication system, which provides at least one power unit to drive a motor and an assigned transmitter system as slave units. Via Fast Ethernet-line drivers within each network user and possible network nodes the telegrams reach the particular protocol components, which process the telegram protocol and in which the time slot access method is implemented. If the protocol component is independent from a microprocessor of the slave-application (the actual power unit), particular application events may be initiated by the control-bits of the telegram frame within the slave without requiring the assigned to the slave microprocessor or corresponding software. This corresponds to a second initiating channel like it may be required for particular security-related applications (i.e. emergency stop, etc.)

In DE 100 04 425 A1 a network with a plurality of network users, for example sensors and actuators, is disclosed, which are connected among each other over the network for the data transfer. In order to obtain an improved precision of the clock synchronization, the first telegram comprises a corrected by a transmission time delay time of a first network user, and a second network user is designed such that it measures the time delay since reception of the first telegram and to correct the time received in the first telegram by the lead time and the reception time delay. If the second network user is furthermore designed such that it is able to send a second telegram for clock synchronization to a third network user, which contains a received time corrected by the lead time and the delay between reception of the first telegram and sending of the second telegram, thus an iterative re-sending of always corrected clock times from network user to network user is feasible. Furthermore start and end of the lead time of a telegram can be defined as the point of time, at which a characteristic field of a telegram with a defined spacing from the telegram beginning leaves a Media-Independent-interface of the first network user, or enters into a Media-Independent-interface of a second network user. Measuring the transmission time delay, lead-time and reception time delay not depending on the length of each telegram may be advantageously. If the network components comply with the Ethernet-, Fast-Ethernet- or Gigabit-Ethernet-specifications, the type-field of the telegram can be used advantageously as a characteristic field of the telegram. A network user, in particular a field device, can be provided with several ports, in particular four ports, for the connection to further network components. Then an interface, a so-called microprocessor-interface, can be provided for the connection of the ports with a network user internal processor bus and a control unit, a so-called switch-control, which initiates a telegram re-direction between the ports and the microprocessor-interface. This has the advantage that network users, in particular field devices, can be interconnected in a linear structure as usually done by field bus users. A separate switch, like required in a star-shaped structure, is not necessary. The integration of switch-functions within the network users has the advantage that in particular regarding Ethernet the CSMA/CD-access control can be deactivated and the network obtains a deterministic behavior. With this the range of applications of network users and the network is extended to those applications, where real-time behavior is required. A gateway for coupling network areas of different physics and with different protocols is not necessary. The communication with application-specific switch units of network users is performed by a microprocessor bus, to which a RAM, a microprocessor and a microprocessor-interface are connected. Task of the microprocessor is to process application programs and communication functions, for example the processing of TCP/IP. A further task may be the management of transmission and receptions lists of telegrams of a different priority within an external RAM. Furthermore four Ethernet-controllers are arranged in an ASIC of the communication interface. Each of those Ethernet-controller enters the data bytes of a fully received telegram into a reception list within the RAM through a multiplexer, a DMA-controller, which is also called a DMA 2-control, and the microprocessor-interface. The microprocessor accesses the reception list and evaluates the received data according to an application program. The microprocessor-interface forms the essential interface between the Ethernet-controllers and the microprocessor bus. It controls and arbitrates the write and read accesses, which are carried out through the DMA-controller or the DMA-controller on the RAM. If DMA-requests of both DMA-controllers are sent, the microprocessor-interface decides on the access rights of both DMA-channels. The microprocessor can further write parameter-registers via the microprocessor-interface, which serve for the operation of the communication interface of the network user. A device of the Ethernet-controllers, named as Transmit-Control, comprises a control unit, which performs the transmission of telegrams, repetitions, transmission abortion, etc. It forms the interface between the internal controller cycle and the transmit cycle. For storing a transmit-status-information for low-prior and high-prior telegrams a transmit-status-register is provided in this device. If a telegram has been sent fail-safe via the port, a corresponding interrupt will be generated. The Media Independent Interface (MII) integrates the MAC-sublayer of layer 2 according to the seven-layer-model, i.e. the data-link-layer. This forms an interface to a block for the physical data transfer. Further the MI comprises a transmit-function-block as well as a receive-function-block. In addition a MAC-control-block, an address filter, a statistical counter and a host-interface are integrated. Control and configuration data can be transmitted to the block via the MII and status information can be read from it.

In distributed automation systems, for example in the sphere of drive technology, specific data must be received by specific users at a particular point of time (i.e. real-time critical data) and must be processed by the recipients. According to JEC 61491, EN61491 SERCOS interface-technical abstract (http://www.sercos.de/deutsch/index deutsch.htm) a successful real-time critical data transfer of the mentioned kind can be provided in distributed automation systems. From the automation technology synchronous, clocked communication systems with equidistance-features are known as, for example, disclosed in DE 101 40 861 A1 for a system and a method for transmitting data between data networks. In detail the first data network provides first means for the data transfer in at least one first transmission cycle, wherein said first transmission cycle is divided into one first range for the transmission of real-time critical data and a second range for the transmission of non real-time critical data. The second data network provides second means for the data transfer in at least one second transmission cycle, wherein said second transmission cycle is divided into a third range for the transmission of real-time critical data and a fourth range for the transmission of non-real-time critical data. For the coupling of data networks with the same or different communication protocols, for example, Ethernet-data-networks, in particular isochrone real-time Ethernet-communication systems, with PROFIBUS-data networks or isochrone real-time Ethernet data networks with SERCOS-data networks and/or FIREWIRE-data networks or PROFIBUS-data networks and/or FIREWIRE-data networks with SERCOS-data networks, finally a coupling unit (Router) is provided for transmitting real-time critical data from the first range to the third range. The possibility to be able to transmit real-time critical data from one data network to another, is used for transmitting cycle-synchronization-telegrams from one clock source of one data network to the other data network, in order to also synchronize local relative clocks by the cycle-synchronization-telegrams in the other data network. Therefore the different data networks have own clock sources each. Because of the cycle synchronization across data networks in each data network user a relative clock can be implemented, which represents an unambiguous time across the system. Based on this basic mechanism events in both communication systems can be collected with a shared time-related understanding or time-related switch-events can be initiated in the own or the other data network. The accuracy of the relative clock corresponds at least to the accuracy of one transmission cycle. The router may then be designed as a discrete device or as an integral part of one user of one of the data networks, wherein also the routing of acyclic, demand controlled communication, for example Remote Procedure Calls (RCP), between the data networks is feasible and the corresponding communication may be carried out with proprietary and/or open protocols.

Automation components (i.e. controllers, drives) in general have an interface to a cyclically clocked communication system. One process level of the automation component (fast-cycle, for example position control in a controller, speed and torque control of a drive) is synchronized to the communication cycle, through which the communication cycle is determined. Other algorithms of the automation component running slower (slow-cycle, for example temperature control) may only communicate with other components via this communication cycle as well (for example binary switch for fans, pumps), even if a slower cycle would be sufficient. By using just one communication cycle for transferring all information across the system high demands arise with respect to the bandwidth of the transmission path. Accordingly for each process or automation level the system components use just one communication system or one communication cycle (fast-cycle) for communication, all relevant information being transmitted in the given cycle. Data, required only in a slow-cycle, can be transmitted gradedly by additional protocols to limit the bandwidth requirements. In DE 101 47 421 A1 a method is disclosed wherein a second user in a switchable data network controls one first user in a switchable data network, wherein the control loop can be closed over the switchable data network. For this purpose the communication between users of the switchable data network is provided via one or more point-to-point connections within synchronized to one another transmission cycles. For the communication of actual and ideal values, or of correcting variables over the data network the real-time-capable band of a transmission cycle is used and the communication of required for the control data telegrams is carried out within determined time windows. Further also a guide value may be transmitted over the switchable data network, which is generated by one of the users of the data network for one or several users of the data network. This could be, for example, the collection of an actual value of an axle, i.e. of a so-called master axle, of a facility. Based on this actual value the particular user generates a guide value, which serves for controlling so-called slave-axles. The functionality of such a control, for example a programmable logic controller, a motion-control system or a numerical control may also be integrated in a drive. Apart from the coupling of an input/output-station to a control unit also a relative clock may be generated within one user. The relative clock is generated by a master clock and cyclically distributed within the network thus implementing the same set of time in all users involved in the network. The time basis for the relative clock is then given by the synchronous transmission cycles and/or subdivision of transmission cycles into time slots. Based on this shared time, events may be collected with time stamps (for example edge identification of digital I/Os) or switching processes (for example switching of digital/analog outputs) may be marked with time stamps and the switching output may be processed based on this shared relative time. Within the real-time communication several communication cycles are potentially provided in order to implement different "quality of services", like for example: 1 ms-cycle for sync connections (guide value via bus), speed target-/position target-/I/O-interface for time-sensitive axles, fast I/O-coupling or 4 ms-cycle for non-time-sensitive axles (frequency converter, simple positioning axles), application data for example: emergency-stop-control, shared shifting register (product pursuit), driving (for example modes of operation) in distributed systems, instruction of new drilling operations (for example drill depth) of automatic drilling machines or asynchronous and/or event-controlled cycle for projection-data and -events or data and routines for error handling and diagnosis.

In order to provide a method for making up a communication system for industry automation based on Ethernet having an essentially determinable communication behavior, response times in the lower ms-range and low cost regarding the communication nodes, finally in DE 100 55 066 A1 a method for multidirectional exchange of information between users (for example programmable controllers) is disclosed. Dependent on the size of the sent Ethernet-data-packet (telegram) it will be subdivided into several smaller packets (short telegrams) and at least one control information will be added to each packet, said smaller packets will be transmitted to their target in several cycles and if applicable will be put back together to the original Ethernet-data-packet by means of the control information. All telegrams, the length of which is longer than the length of the short telegrams, will be subdivided and all short telegrams have the same fixed length. Source and target of the short telegram, no matter whether subdivided or not, independent of in how many short telegrams it was subdivided, and the current number of the short telegram can be learned from the control information. For the multidirectional exchange of information between users (for example programmable controllers), wherein a user may be assigned to an industrial domain switch (IDS), which is connected to the IDS via an Ethernet-connection, the IDS are structured as a network via a connection in conformity with Ethernet and each IDS obtains a time wise determined transmission right controlled by a determined, cyclic framework. When starting the system or restarting it (Power On or Reset) the assignment of a transmission right will be negotiated between the IDS via a management function by management telegrams, regarding which the IDS recognize that those are management telegrams. The entire control logic of the IDS may be integrated into a high-integrated electronic component.

As shown by the foregoing description of the present state-of-the-art, in the automation technology various interfaces with their physical characteristics and transmission protocols are defined for the communication between individual devices and are standardized according to international specifications or become established as industry standards. These systems are generally called field bus systems, wherein also Ethernet-based technologies belong to those. The interfaces are made up in form of dedicated communication-controllers, partly with CPU as integrated circuits (communication-processor) as shown for example in DE 198 31 405 (ASIC: ASPC2), DE 299 07 909 (ASIC: SPC3), DE 199 28 517 C2 (ASIC: SUPI), DE 100 04 425 A1. As well the entire interface is often designed as an exchangeable module, comprising a connector, physical interface, dedicated communication-controller, microprocessor with memory and transfer logic to the CPU of the programmable controller, as a rule a Dual-port Memory. This module realizes exactly one specific transmission protocol and has to be specifically developed in its entirety to comply with this requirement. As a rule the communication-processor comprises only one specific communication-controller for a specific field bus system, however in the meantime circuits are available, which comprise several of these dedicated communication controllers, as it is disclosed in the U.S. patent application Ser. No. 09/780,979 for a communication-controller according to the CAN-standard and a communication-controller according to the Ethernet-standard. As a rule then specific hardware and software components are required together with some expensive components particularly adapted to communication requirements, like HUB and line drivers, Ethernet-controllers, Media Independent Interface for the connection to another network (public data network, other LAN or a host system), field bus interfaces or sensor bus-interface, in particular Serial Peripheral Interface with Master- or Slave-protocol-chips, as well as the conversion of corresponding network-access-protocols, for example CSMA/CD (Carrier Sense Multiple Access/Collision Detection), Token-Passing (binary pattern as authorization mark) or TCP/IP (Transmission Control Protocol/Internet Protocol) in for the field bus specified protocols. Almost no attention is paid to the development of such a circuit or a communication interface permitting an individual and comfortable matching of communication functions independent of a specific field bus system. As a rule the communication-controller implements only one specific field bus system for the communication of the usual SPS-function blocks, wherein for example drives are synchronized to each other via fast, deterministic and jitter-free communication connections. This is carried out by detecting a specific data or event in the communication controller, which initiates the downstream CPU by an interrupt to execute the synchronous drive functions, like measuring the position or the output of the correcting variables. This method has the disadvantage that the accuracy of the synchronization is decisively affected by the interrupt-latencies of the CPU, in particular when using operating systems, which block the interrupts for specific periods of time. Therefore in practice low-cost methods and communication interfaces are missing for an automation system operable in real-time, which ensures an individual, in particular automatically adjustable, interactive communication or allows a simple exchangeability or function blocks for an automation system operable in real-time, which also without additional hardware-function modules and without costly adaptation of interfaces establish quick and economically demanding automation solutions. In particular this is important, because the telecommunication and computer industry, in particular in the sphere of automation and drive technology, can be deemed very progressive and innovative industries, which very quickly pick up improvements and simplifications and implement those.

Object of the invention is to design a method for data communication of bus users of an open automation system such that the connection of an optional number of bus users to an individual, interactive communication may be permitted. Further objects are to provide exchangeability of parts of the apparatus or to provide an automatic and highly accurate synchronization.

SUMMARY OF THE INVENTION

The task according to the invention is solved with a method for data communication, in particular for the coupling of communicating among each other bus users of an open automation system with distributed control functions via a serial data bus, said bus users cooperating via a communication controller with a superior control unit, wherein:

the communication-controller is made up of at least one freely-programmable communication ALU, several commands are encoded on a command code for the communication ALU and which is optimized for particular communication functions, logic function blocks are arranged in parallel in the communication ALU which carry out particular communication functions, said communication functions not being definitively defined, but rather are formed on the basis of the freely-programmable and communication function optimized communication ALUs, whereby several commands are carried out in a system cycle and transitions between the various networks can be carried out.

According to the invention said method provides in a very simple way the making up of a "quasi firm" communication controller, said communication controller being made up of one or several freely-programmable communication ALUs (Arithmetic and Logic Unit), said ALUs providing a communication tasks optimized command set and hardware architecture. Therefore the following advantages are provided according to the invention:

The development, production and sale of such a circuit may be carried out independent of a particular field bus system/Ethernet.

Extensions within the field bus-/Ethernet and in particular real-time-Ethernet specifications or implementations of completely new field bus systems may be carried out per software update and do not require a new circuit.

In particular regarding two or more communication interfaces within a circuit the particular field bus-/Ethernet systems will be defined by loading the software and therefore may be combined with a high flexibility.

Furthermore the task according to the invention is solved with a device for data communication, in particular for coupling communicating among each other bus users of an open automation system with distributed control functions via a serial data bus, which comprises:

a communication-controller, which cooperates with a superior control unit and which provides at least one freely-programmable communication-ALU, a command code, on which several commands are encoded and which is communication function optimised, and a parallel arrangement of at least two logic function blocks in the communication ALU, which carry out special communication functions.

said communication functions not being definitively defined but rather are formed on the basis of the freely-programmable and communication function optimized communication ALUs, wherein several commands are carried out in a system cycle and transitions between the various networks can be carried out.

Compared to the design of a dedicated communication-controller through programming of FPGAs (Field programmable Gate Array) or parts of it according to the state-of-the-art, which corresponds to a fixed wired logic, the device according to the invention provides the above-described advantages. Furthermore unlike the conventional ALUs commands are carried out in one cycle in parallel. According to the invention the logic function blocks are accordingly arranged in parallel in the communication ALUs and at the same time may process the command code, wherein even in case of high baud rates, i.e. 100 MHz Ethernet, the necessary functions may be executed.

As disclosed in DE 42 20 258 C2 a device for processing data of bit-serially transferable data on a transmission line is known per se, said data, corresponding to a predetermined protocol for data transfer, may be transmitted in series, and within an interface before being transmitted are available as a data word or after having been transmitted are reconstructable as a parallel data word, and wherein several commands may be carried out in a bit-clock of a system cycle. In detail a bit processing unit is provided for an adaptation to a particular predeterminable transfer protocol, which comprises optionally selectable conversion elements, said conversion elements processing individual data bits according to a particular protocol convention and being coordinated by a control unit. Said bit-processing unit at least provides one comparator for data bits following each other in sequence, the output signal of which is sent to the control unit. Further a coupling element is arranged between the transmission line and the bit-processing unit, said coupling element being designed as decoder unit or as encoder unit for the data output. For increasing the operating speed in case of timely nested communication and processing procedures to be processed the bit processing unit, the coupling element and two switchable and via the control unit optionally activatable RAMs are connected to an internal bus. Further for changing the sequence of bits dependent of an individually predetermined protocol structure one of the conversion elements of the bit processing unit may be designed as a bit changer. In particular regarding protocols with different sequences of bit priority said bit changer is designed such that it may reflect a bit being arranged within a data word at the middle of said data word. One of said conversion elements of the bit-processing unit is designed as a sorting unit, thus allowing inserting a serial bit at any place of a data word. In order to ensure a sufficiently high processing speed, for example within the range of 1 Mbit/s, said conversion elements are implemented mainly by means of circuit design. In contrast thereto the device according to the invention—as a result of the flexible command set and the belonging to it logic function blocks—may solve several tasks in parallel in a much higher system cycle, that is 100 MHz, and event-controlled, wherein a high processing speed may be obtained independent of protocols. Regarding the device disclosed in DE 42 20 258 C2 a special communication solution has been developed, according to the state-of-the-art, for the transfer of data on the Data Link Layer (layer 2), without taking into account higher network layers and user-close services, like the configuration of parameters or network-management. Regarding office—and home applications according to IEEE 802.11 as a rule it is not important, whether the data transfer stagnates in cases of a higher network load and a telegram has to be repeated. In the automation technology the cyclic data exchange with the individual users (devices) has to be ensured, that is within a defined period of time a fixed data volume has to be transferred. The solution according to the invention also ensures the transfer of time-sensitive data, so that a high Quality of Service (QoS) and a network migration may be obtained, for example to migrate a CAN-bus to a Ethernet-sphere being up to one hundred times quicker. Further in a preferable way the initializing of new and the exchange of faulty devices may be carried out by plug & play and the flexible communication mechanisms simplify the use in many applications and system architectures. According to the invention the use of a gateway, which has to reformat application data, that is a device, which translates the services of one application layer into the other application layer, causing much effort, in particular regarding bit-oriented data, is not required. According to the invention the connection between a bus system and a network is provided through implementation on the data link layer, whereby for example CAN-messages can be translated into Ethernet-messages, as the higher protocols (application layer) are identical. In particular not only Master/Slave-systems, but also distributed control units, which require at least partially non-hierarchical network architecture with a permeability into both directions, may be established.

The task according to the invention is further solved with an apparatus with flexible communication structure, in particular programmable controller, providing:
- at least one freely-programmable communication controller cooperating with a superior control unit,
- at least one freely-programmable communication-ALU integrated in the communication-controller and
- an exchangeable, physical interface being connected to the communication controller via signal lines for the transfer of an identification code, control data, input and output data, said physical interface thus being exchangeable.

The programmable controller, according to the invention, permits in a very simple way to make up a "quasi firm" communication controller, said communication controller being made up of one or several freely-programmable communication ALUs (Arithmetic and Logic Unit), said ALUs providing a communication function optimized command set and hardware architecture. According to the invention the following advantages are accordingly provided:
- The physical interface, formed as an exchangeable module, is essentially smaller, cost-efficient and connected to the freely programmable communication controller in the programmable controller by one out- and input-line and a few control lines. In contrast thereto about 40 signal lines are otherwise required for data-, address- and control-line-bus of the usual Dual-port Memory coupling, said coupling comprising much higher frequent signals and limiting the connection to a length of a few centimeters.
- Based on the few signal lines the exchangeable physical interface may be placed at any other place in the programmable controller by means of a flexible connection.

The task according to the invention is further solved with a method for data communication, in particular for the configuration of an apparatus with flexible communication structure, in particular a programmable controller, with at least one communication-controller, with at least one communication ALU integrated therein and at least one physical interface, wherein
- the communication functions are not definitively defined but rather are formed on the basis of the freely-programmable and communication function optimized ALUs,
- the physical interface sends an identification code on a signal line to the communication controller during the start phase and
- said communication controller automatically carries out the right configuration and loads the assigned to it software into the communication ALUs.

According to the invention the following advantages are provided:
- The development, production and sale of such a programmable controller with exchangeable, physical interface circuit may be carried out independent of a specific field bus system.
- Extensions within the field bus specification or implementations of completely new field bus systems may be carried out per software update and do not require a new interface circuit.
- In particular in case of two or several communication interfaces the particular field bus systems are defined by loading the software and therefore may be selected with a high flexibility.

The task according to the invention is further solved by a method for data communication, in particular for synchronizing bus users of an open automation system with distributed control functions, said bus users communicating among each other on a serial data bus and comprising a "quasi firm" communication-controller, said communication-controller cooperating via at least one freely-programmable communication ALU with a downstream control unit, wherein
- said communication-controller detects the occurrence of a specific data or event,
- said communication ALUs carry out the synchronous control functions and
- between the synchronization times measurements and correcting variables are exchanged with the downstream control unit, said interrupt-latencies of the downstream control unit not affecting the direct synchronization of the control functions.

According to the invention the method provides in a very simple way, while maintaining the modular structure, the communication via a cycle-synchronous and equidistant bus for the control of highly precise processes in shortest cycle times. According to the invention the control and communication solution is based on a "quasi firm" communication-controller, said communication controller being made up of one or several freely-programmable communication ALUs, said ALUs providing a communication task optimized command set and hardware architecture. According to the invention the following advantages are provided:
- The development, production and sale of such a circuit may be carried out independently of a specific field bus system.
- Extensions within the field bus specification or implementations of completely new field bus systems may be carried out per software update and do not require a new interface circuit.

In particular in case of two or several communication interfaces the particular field bus systems are defined by loading the software and therefore may be selected with a high flexibility.

According to the invention the combined control and communication solution may be implemented despite complying with real-time critical demands with reasonable expenditures and provides—as a result of a continuous programming and shared data keeping (all identifiers are automatically known system-wide and unambiguous)—still enough space for future expansions, for example to parallel processes, insert sub-routines, operate analog and digital in and outputs on demand and optionally operate axles individually or with different dependencies towards each other.

The task according to the invention is further solved with a method for data communication, in particular for synchronizing bus users of an open automation system with distributed control functions, said bus users communicating among each other on a serial data bus and providing a "quasi firm" communication-controller, said communication-controller cooperating at least via one freely-programmable communication ALU with a downstream control unit, wherein at start point of cyclically running control functions the synchronized local time is stored, by computing the difference with the stored time at the last start point the cycle time is measured based on the local time and by enlarging or reducing the current cycle time, said cycle time in relation to the local time can be kept constantly and in a firm phase relation, said entire cycle thus being synchronized to the local time in its cycle time as well as in its phase position.

In contrast to the inventive method with which the "quasi firm" communication controller carries out a direct synchronization of the control functions without the downstream control unit, the synchronization can also be carried out in accordance with a stored local time at every start point of a control function. Regarding both methods the interrupt latencies of the downstream control units do not affect the synchronization of the control functions, wherein described second method requires some more hardware expenditures for maintaining a local time.

The task according to the invention is finally solved with a device for data communication, in particular for the synchronization of communicating among each other bus users of an open automation system with distributed control functions on a serial data bus with:

a "quasi firm" communication-controller, which at least provides one freely-programmable communication ALU, a control unit downstream to the communication controller and at least one logic function block with means for measurement and storage of times in the communication ALU, said communication controller carrying out a direct synchronization of the control function without the downstream control unit or the synchronization is carried out at every start point of a control function in accordance with a stored local time.

This design of the invention has the advantage that two powerful methods may be used without requiring a basic hardware adaptation. This may be attributed to the integrated, simply parameterizable drive parameters by the interface programming in the "quasi firm" communication controller.

In a further design of the invention, the communication processor comprises several freely programmable communication-controllers.

This further design of the invention has the advantage, that the microprocessor necessary in the exchange module and the assigned to it infrastructure like memory and Dual-port-Memory for each channel may be saved compared to the state-of-the-art.

According to the invention, the physical interface may be preferably designed as a printed circuit in the line connection.

This design of the invention has the advantage that as a result of the small sizes of the physical interface, said interface may be designed directly as a printed circuit forming the plug connector of the line connection.

According to the invention, the communication processor preferably processes the application and the transfer protocol.

Due to their high efficiency microprocessors of today may process the application as well as the transmission protocol. Therefore advantageously a second microprocessor and the assigned to it infrastructure like memory and Dual-port-Memory in the exchange module may be saved.

Further advantages and details may be learned from the following description of preferred designs of the invention taking into account the drawings, which show:

DESCRIPTION OF THE PREFERRED EMBODIMENT

Figure 1:
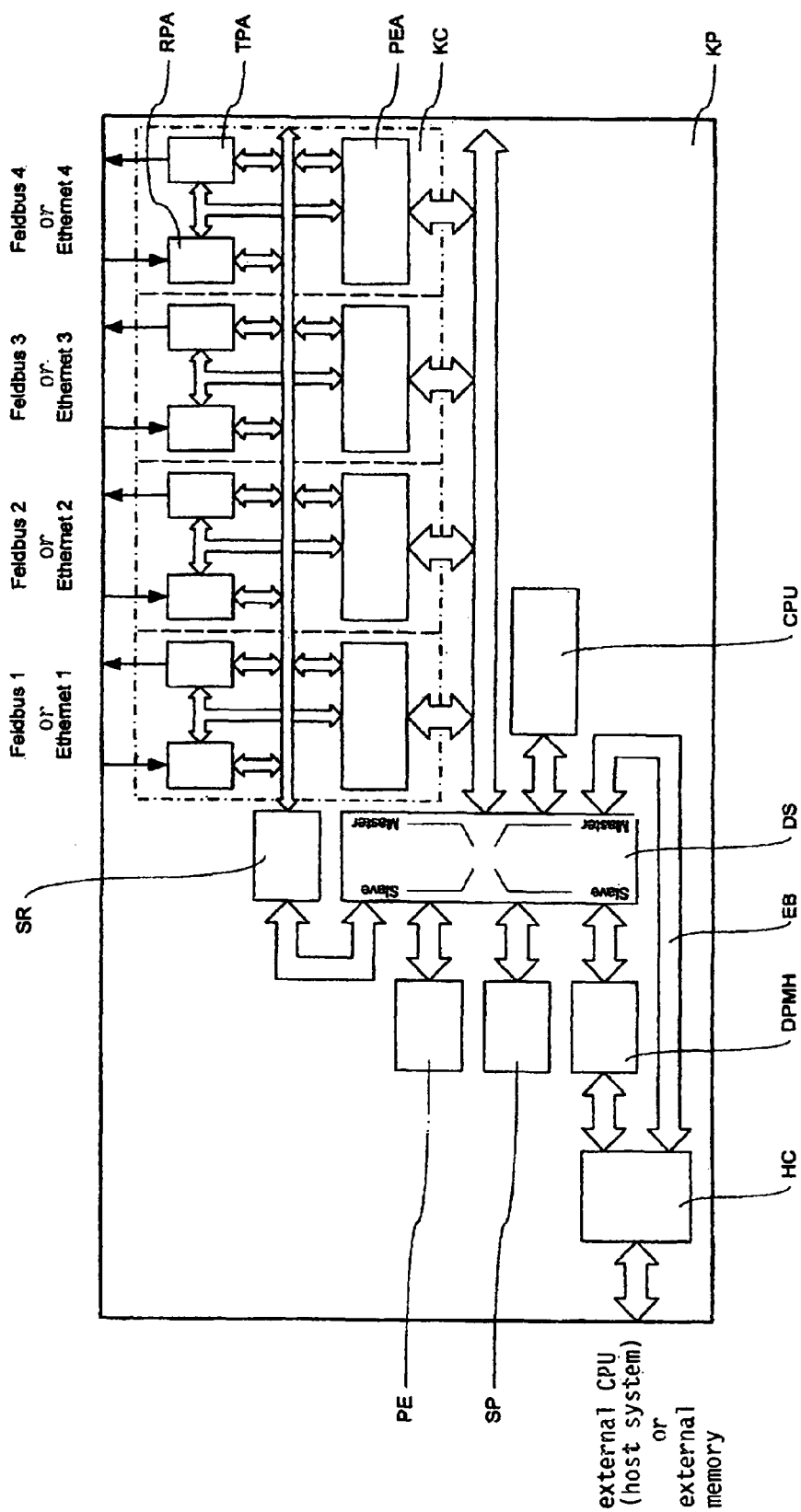
FIG. 1 the functional block diagram of a communication-processor with a freely-programmable communication-controller, FIG. 2 the functional block diagram of a freely-programmable communication-controller for a communication processor according to FIG. 1 and FIG. 3 an example for a command code according to the invention, FIG. 4 the functional block diagram of a programmable controller with flexible communication structure according to the invention, FIG. 5 the functional block diagram of one design with direct synchronization of drive functions, FIG. 6 the functional block diagram of a second design with storage of system time with every start of a drive function and FIG. 7 a time diagram with synchronization of the PWM-cycle to the local system time for the design of FIG. 6 according to the invention.

Already for years different communication systems with standardized communication services and protocols, being able to communicate between heterogeneous and homogenous networks, are used in the automation technology. On the lower level there are arranged for example simple sensor-actuator-bus systems or back plate bus systems (for example modular input- and output devices to be placed on commercially available standardized mounting rails), on the middle level "embedded" networks for the controlling of machines (which connect programmable controllers, complex electrical and hydraulic driving devices, input-/output-devices, data acquisition devices or man-machine interfaces) and on the upper level networks for fabrication automation. According to the invention and with respect to communication relations a coherent logic network is designed such that a sharp dividing line between the technique in usual telecommunication networks, described as follows, and computer data networks may not be clearly drawn any more.

In the telecommunication technology as a rule the data transfer of continuous data streams, for example speech or video communication, is carried out via packet switched communication networks, like for example LANs (Local Area Networks), MANs (Metropolitan Area Networks) or WANs (Wide Area Networks). Increasingly also the ADSL-technique (Asymmetric Digital Subscriber Line, asymmetrical DSL-data transmission technology) is used. Beside the ADSL-technique also other DSL-techniques are used, for example HDSL=High Data Rate Digital Subscriber Line; SDSL=Single Line Digital Subscriber Line; MDSL=Multirate Digital Subscriber Line; RADSL=Low Rate Adaptive Digital Subscriber Line and VDSL=Very High Rate Digital Subscriber Line, which may be optimized for each application and are summarized under the generic term xDSL-transmission technique. The communication is provided via connections having various bandwidths, i.e. for example 56 KBit analog connection or 64 KBit-ISDN or DSL or—as far as integrated in a LAN—via 100 MBit twisted-pair-line, or via switched connections 2 MBit and better, or via dedicated lines X 25. Accordingly a plurality of interface devices is known, for example:

ISDN $S_0$—interfaces,
LAN-Interface FE (with program storage) to PCI-Bus,
external LAN-Interface LAN (with program storage) as 10/100 Mbit/s Ethernet or Token-Ring,
WAN-interfaces WAN: X.21, V.35, G.703/704 up to 2 Mbit/s.

All interactions of the user are then fed into the dialog between user and an interactive server through events and in a dialog control DE the session-ID is stored as an account. The hardware concept of the interactive server has to be adapted to the various, grown connection standards in the worldwide network operation. Specially adapted LAN-modules with optional BNC-, AUI-, LWL- or Twisted Pair-Connections connect the interactive server with local Token-Ring- and Ethernet-networks. Access to wide area networks (i.e. ISDN, X 25) and dedicated lines is provided by partly multichannel WAN-adapters ($S_O$, $U_{PO}$, $U_{KO}$, X.21, V.24, V.35). Active WAN-adapters may be used in order to obtain optimal performance. In the ISDN-range the protocols DSS1, ITR6, NI-1, as well as Fetex 150 are available.

Figure 2:
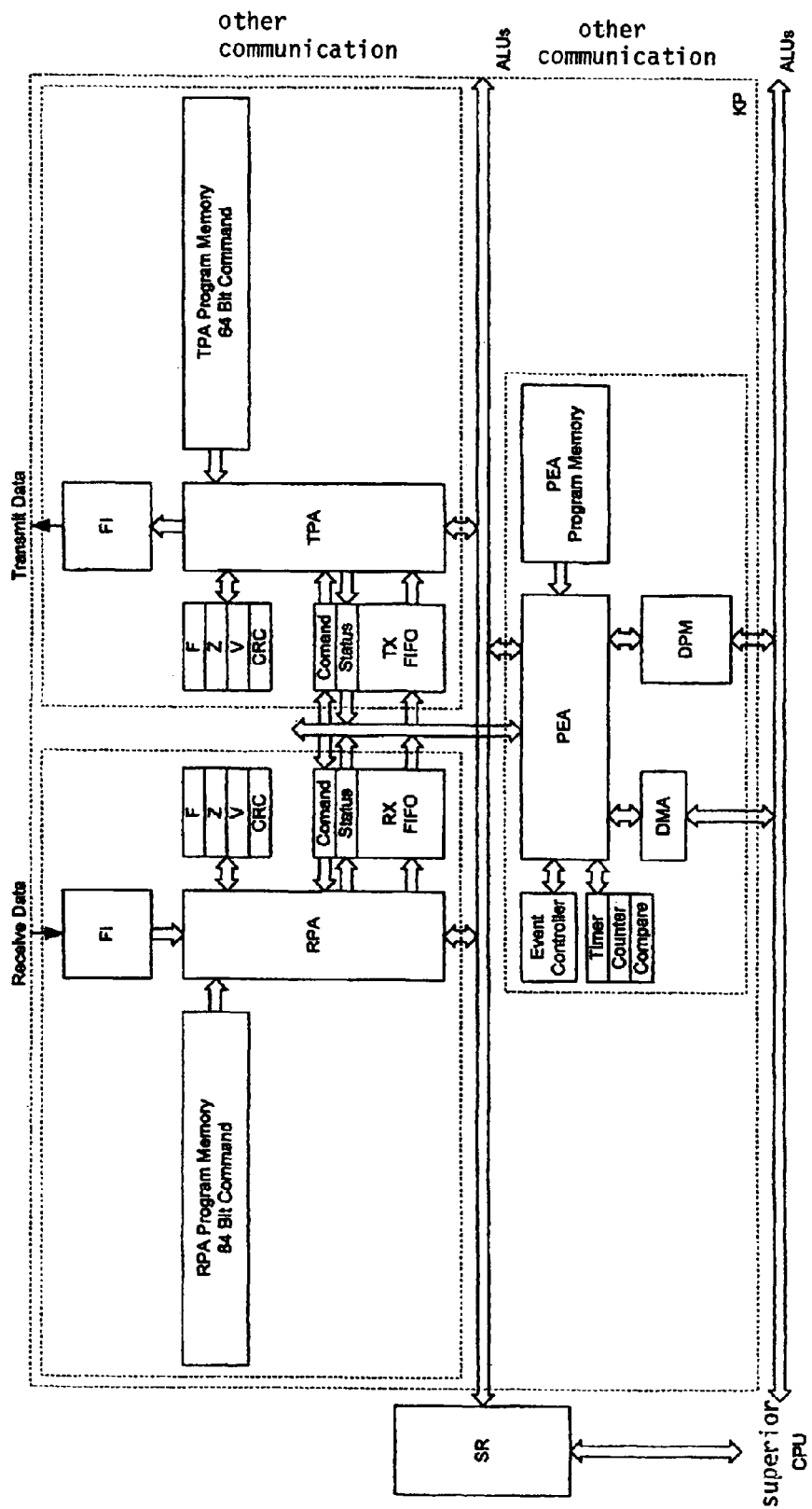

According to the invention FIG. 1 shows interfaces formed as a freely programmable communication controller KC. According to the invention said communication controller comprises three communication-ALUs, shown in detail in FIG. 2, that is:

the Receive Processing ALU (RPA) being responsible for decoding received bit- or nibble (half a byte) serial data stream in accordance with the transfer rate and converting said data stream into a parallel form (i.e. byte, word or double word), the Transmit Processing ALU (TPA) being responsible for encoding data out of a parallel form into bit- or nibble serial data stream and feeding said data into the line with the correct transfer rate and the Protocol Execution ALU (PEA) being responsible for controlling the input- and output sequence of a related data packet.

Figure 3:
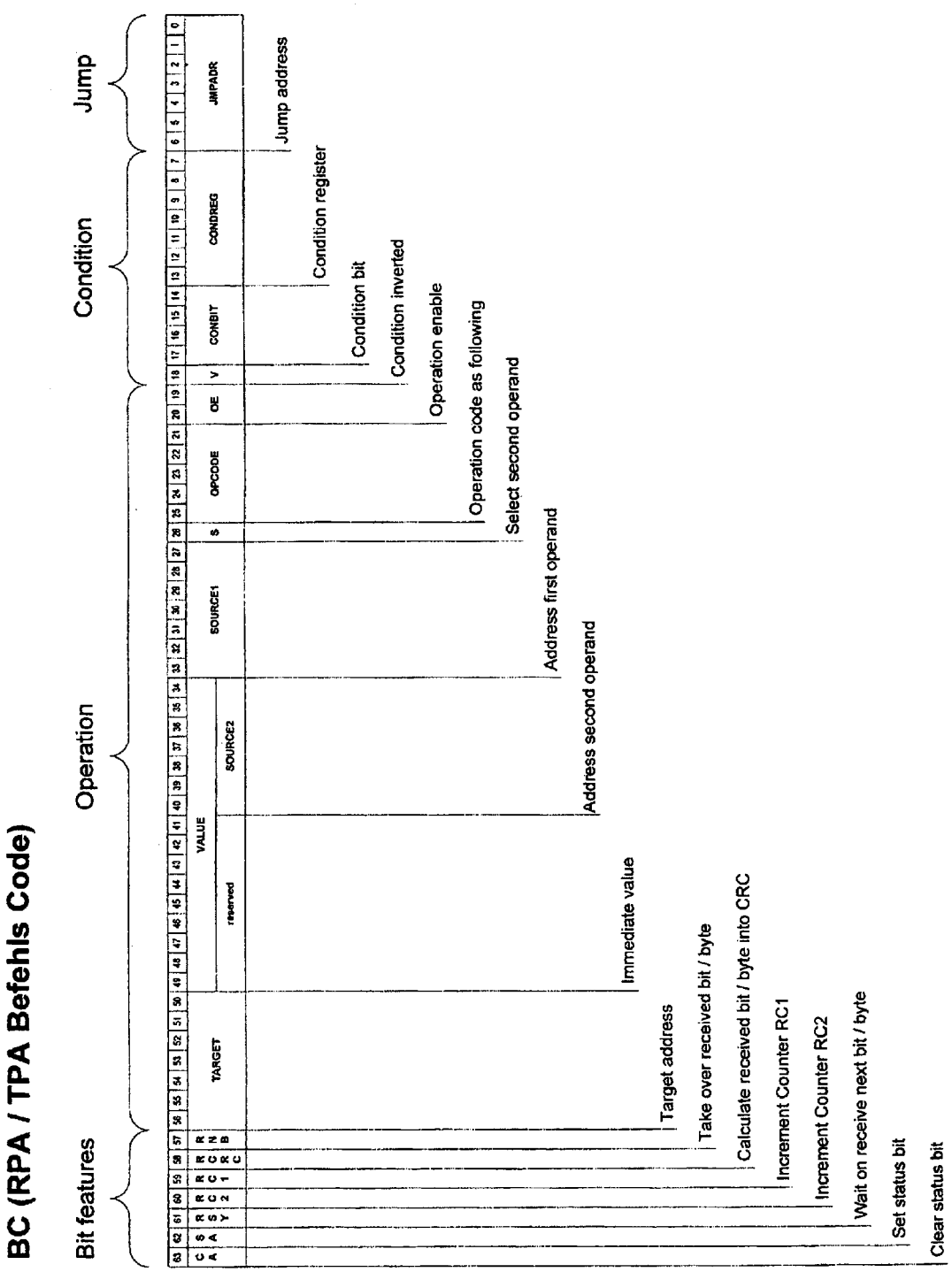

In order to be able to implement the necessary functions also with high baud rates, for example 100 MHz Ethernet, the following requirements are met according to the invention:

The communication ALUs RPA and TPA may carry out several commands in parallel. According to the invention for this a wide command code BC (see FIG. 3) is used, for example 64 Bit, on which several commands (see FIG. 3: the seven most significant bits, operation, condition, jump) are encoded. These may be, for example, logical operations, program jumps, setting and deleting of bits in the flags F, incrementing and decrementing of counters, transfer of data and operating of specific function registers. Unlike conventional ALUs said commands may be carried out in parallel in one cycle. According to the invention therefore the logic function blocks are arranged in parallel in said communication ALUs and may process said command code BC at the same time.

The communication ALUs RPA and TPA provide special function registers, which also have an impact in parallel on the data to be processed. In detail these are:
    shifting registers F1, to/from which serial data may be shifted automatically in and out and make the insertion and deletion of bits possible at any position,
    counters Z, which automatically count serial data and compare registers, which set a bit in case of equality,
    comparing registers V, which compare serial data according to particular bit patterns and in case of equality set a bit in the flags F,
    CRC-generators CRC, which automatically compute CRC-polynoms from the bit-serial data, Unlike conventional ALUs the communication ALU PEA monitors a plurality of specific events per hardware in parallel. For example this may be:
    the transfer of specific data from the RPA or to the TPA or to the superior CPU,
    the lapse of time,
    the monitoring of certain counter readings or
    the setting of particular status bits.

If one or a particular combination of events takes place, the communication-ALU PEA reacts within a system cycle through processing a piece of program code assigned to the event.

Further within one system cycle the communication ALU PEA is able to:
    read a data out of a local Dual Port Memory DPM,
    process and
    transfer to the communication-ALU TPA or rather from the communication-ALU RPA
    take over,
    process and
    store in the local Dual Port Memory DPM.

The access to the local Dual Port Memory DPM is carried out via two registers twice indexed, in order to be able to access the data structures being usually used in communication technology within one system cycle.

According to the invention the interface between the communication ALUs PEA and RPA or TPA is formed as FIFO, in order to intermediately store incoming and outgoing data.

According to the invention the interface between the communication controller KC and a superior control unit CPU is formed as a DMA-controller DMA for the quick transfer of high data volumes and also as a Dual-Port-Memory DPM for maintaining status variables and as a shared register set SR for the synchronization.

According to the invention for synchronizing the communication ALUSs PEA, RPA or TPA among each other a set of shared registers SR is provided on which each communication-ALU PEA, RPA or rather TPA may write and read out.

The superior CPU may also access the shared registers SR in order to monitor or control the communication status.

Further functions of the communication-ALU TPA, which are implemented per software regarding Ethernet-protocols, are: mapping the to be sent bytes, identifying collisions in half-duplex operation and executing a back-office-algorithm, providing the communication ALU PEA with transmit-status-information after end of a transmission process, observing the rest time Inter-Packet Gap (IPG) between two telegrams, complementing outgoing data by a preamble, a Start-Off-Frame-Delimiter (SFD) and a parameterizable Cyclic-Redundancy-Check-Word (CRC), padding of a telegram with pad-bytes in case the telegram length would be <60 byte and aborting a transmission process on request. Further functions of the communication ALU RPA are: placing received bytes at the disposal of the communication ALU PEA, identifying the Start-Of-Frame-Delimiter and a VLAN-Frame (Virtual-LAN), checking of the field length and the CRC-word in telegrams, placing Receive-Status-Information at the disposal of the communication ALU PEA after end of a reception process and deleting the preamble and Start-Of-Frame-Delimiter in telegrams.

These communication ALUs PEA, RPA or TPA cooperate with the superior control unit CPU, which may be either integrated in the circuit or may also be arranged externally. If the superior control unit CPU is integrated, the circuit may carry out the communication functions and accordingly provides the Dual-port Memory DPMH for the connection with another control unit (host system) or said circuit—apart from the communication—carries out the entire application and accordingly provides the internal system bus as an extension bus EB for the connection with an external memory and periphery block. As a preferred design the host computer interface device provides a host control device HC connected to address-, data-, control bus lines, which may be switched over between an extension bus EB for connection with a memory and periphery blocks and the Dual-port Memory DPMH for connection with a further superior control unit. For both operation modes it would make sense to use the same signals and to switch those over per software. At the same time the register set SR and the Dual-port Memory DPM of the communication-ALUs RPA, TPA, PEA may be read out and written on in parallel to the running operation of the superior control unit (CPU), so that an industrial real-time Ethernet solution with network cycles and a precision within a range of micro seconds may be obtained, which does not need any support of proprietary hardware components or ASICs. This also applies for the optimization and adjustment of the real-time transfer, like adaptation to the demands of the application, to the system and to the communication architecture, so that a constant data access may be permitted from the management-level down to the field-level.

As shown in FIG. 1 the device according to the invention also provides a Data Switch DS, said data switch connecting for example a 32-Bit-Control-Unit CPU and the other communication-ALUs PEA (wherein in FIG. 1 four separated communication controllers KC are shown) with a memory SP, the internal periphery PE and a dual-port memory DPMH assigned to the host control device HC. Said data switch DS avoids the "bottle-neck" of a shared bus known from other communication-processors by enabling the master ports accessing at the same time data via the different slave ports (two in the exemplary design).

Figure 4:
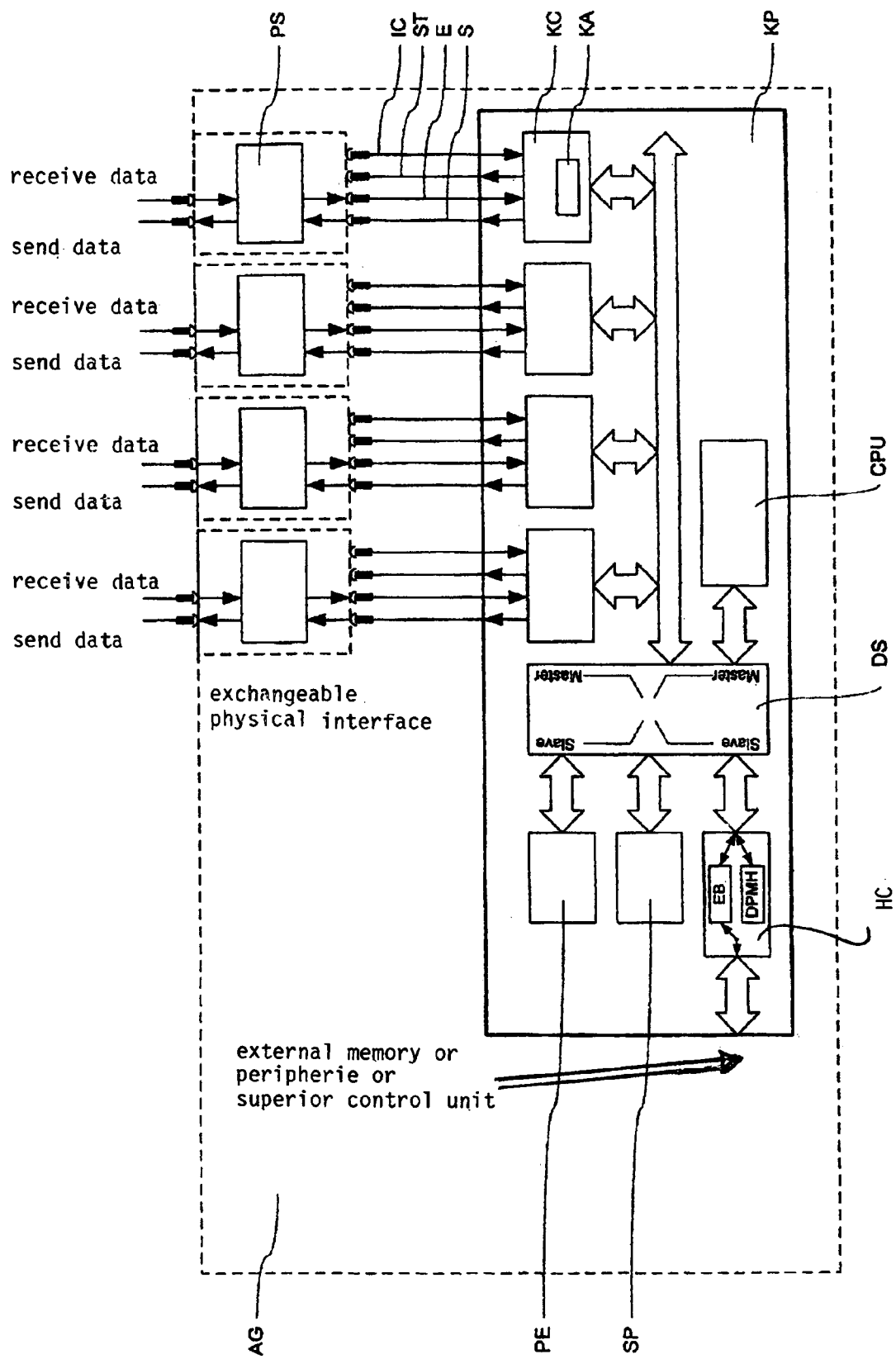

As shown in FIG. 4 the programmable controller with flexible communication structure according to the invention comprises a base board of said programmable controller AG providing a communication-processor KP with at least one, four in the exemplary design, freely-programmable communication-controller KC. According to the invention at least one of said freely programmable communication-ALUs KA is integrated in the communication-controller KC. As described above, said communications-ALUs KA are responsible to decode the incoming bit- or nibble- (half byte) serial data stream according to the transfer rate and to convert said data stream into a parallel form (i.e. byte, word, double word) and/or to encode data out of a parallel form into a bit- or nibble serial data stream and to feed said data into the line with the correct transfer rate and/or to control the input- and output sequence of a related data packet Further said base board of the programmable controller AG provides at least one, in the exemplary design four, physical interface being connected to the communication-controller KC via signal lines IC, ST, ED, SD, said interface transmitting a particular identification code, control data, input and output data. As shown in FIG. 4, said communication-processor KP also provides a data switch DS, said switch for example connecting a 32-Bit-Control-Unit CPU and the communication-controllers KC (wherein in FIG. 4 four separated communication controllers KC are shown) with a memory SP, the internal periphery PE and a host control unit HC. The host control unit HC may be switched between an extension bus EB for connection with a memory and periphery blocks and the dual-port memory DPMH for connection with a further superior control unit. Said data switch DS avoids the "bottle-neck" of a shared bus known from other communication-processors by enabling the master ports (in the exemplary design two) accessing at the same time data via the different slave ports (in the exemplary design three). Then the memories and the dual-port memory DPM may be read out and written on in parallel to the running operation, so that an industrial real-time Ethernet solution with network cycles and precision within a ms-range may be obtained, which does not need any support of proprietary hardware components or ASICs. This also applies for the optimization and adjustment of the real-time transfer as well as for the compliance with the demands of the application, of the system and the communication architecture, so that a constant data access may be permitted from the management-level down to the field-level.

According to the invention said communication functions are not definitely defined, but rather are formed on the basis of freely programmable and communication function optimized communication ALUs. In the start phase said communication-controller KC reads in the identification code of a physical interface PS, afterwards configures the communication-ALU KA matching and automatically loads the belonging to it firmware. Further said communication-processor KP provides several freely programmable communication-channels and accordingly may implement any combination of communication-standards. In a preferred design of the invention based on several freely-programmable communication-controllers KC said communication-processor KP may also—apart from the communication-protocols—process the application.

According to the invention said physical interface PS may be designed as an independent, exchangeable module without own intelligence or control functions, said physical interface logging in by help of an identification code on said freely-programmable communication-controller KC during start phase and thus authorizes said communication-controller KS to load the matching configuration and assigned to it firmware. According to the invention in particular not only master/slave-systems, which require at least partly non-hierarchical network architecture with permeability in both directions, may be established, but also distributed control functions.

Figure 5:
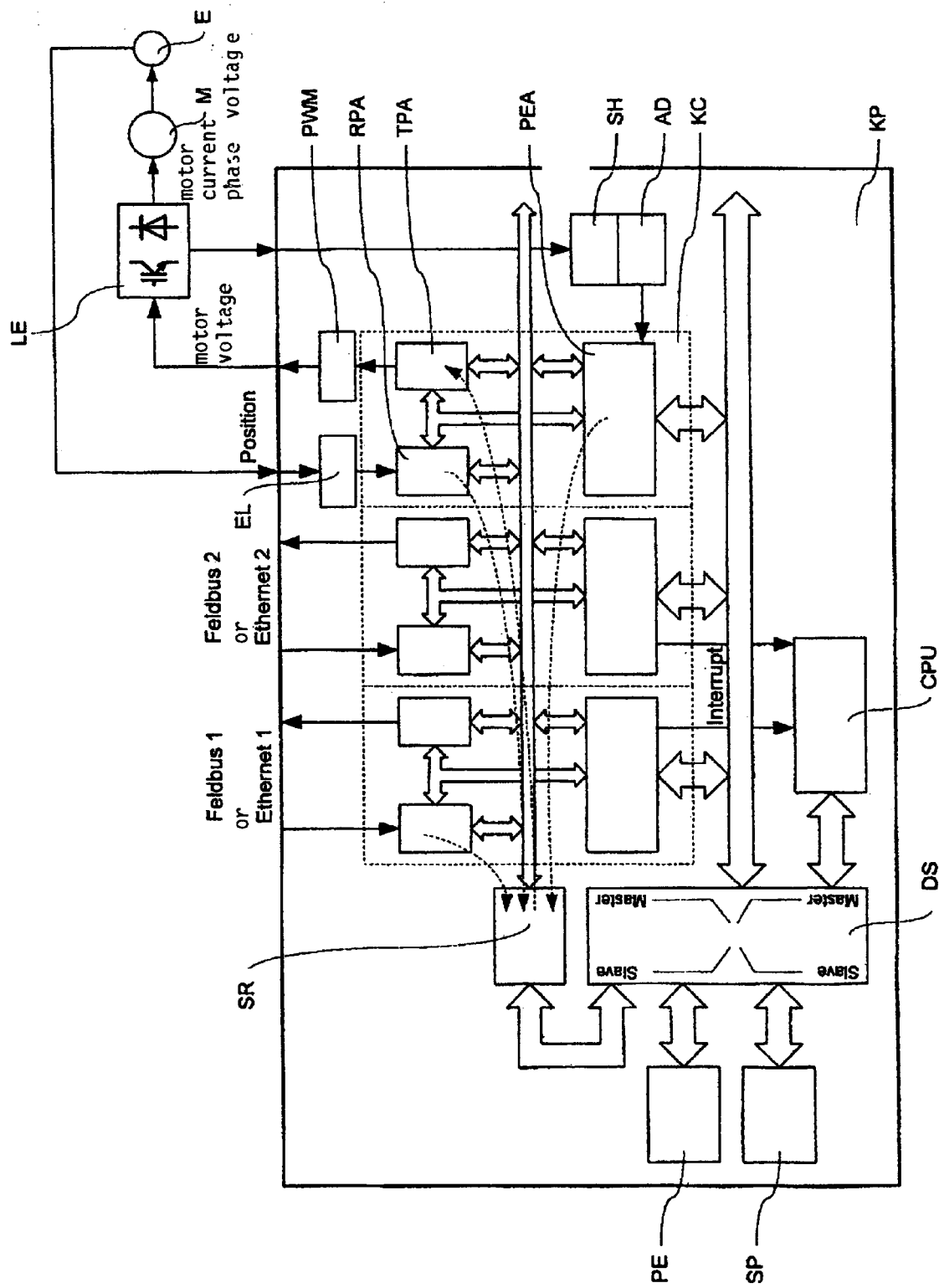

According to the invention in FIG. 5 a "quasi firm" communication-processor KP is shown, which provides at least one, in the exemplary design three, freely-programmable communication-controller KC with three communication-ALUs RPA, TPA, PEA each. Said first communication-ALU RPS is responsible, as described above, in accordance with the transfer rate to decode the received bit- or nibble (half Byte) serial data stream and to convert said data stream into a parallel form (i.e. byte, word, or double word), said second communication-ALU TPA is responsible, as described above, to encode data out of a parallel form into a bit- or nibble-serial data stream and to feed the line with the right transfer rate and the third communication-ALU PEA is responsible, as described above, to control the input- and output sequence of a related data packet In FIG. 5 a preferred design of the invention is shown, wherein said communication-controller KC provides the Pulse-Width-Modulation-stage PWM for driving the output stage of the motor, the encoder logic EL for reading in the actual-position and the sample-and-hold-stage SH and the analog-digital-converter AD for measuring phase voltage and motor current. In particular the position motor voltage and motor current or phase voltage is transmitted between communication-controller KC and drive.

As shown in FIG. 5, said communication-controller KC also provides said data switch DS, said switch for example connecting said downstream 32-Bit-Control-Unit CPU and said communication-ALUs KC with said memory SP and said internal periphery PE. Said communication-ALUs RPA and TPA may process several commands in parallel. For this purpose a wide command code BC may be used, as described above, for example 64 Bit, on which several commands are encoded. These may be for example logical operations, program jumps, setting and deleting of bits, incrementing and decrementing of counters, transferring data and operating special function registers. Unlike conventional ALUs these commands may be carried out in one cycle. Accordingly said communication-ALU PEA monitors a plurality of special events per hardware in parallel unlike conventional ALUs. This may be for example:

the transfer of specific data from the communication-ALU RPA or to the communication-ALU TPA or to the downstream CPU
the lapse of time,
the monitoring of particular counter readings or
the setting of certain status bits.

If one or a particular combination of events occurs, the communication-ALU PEA reacts within a system cycle by processing a piece of a program code assigned to the event.

Furthermore within a system cycle said communication-ALU PEA may:
read out a data of a local memory SR,
process said data and transfer it to said communication-ALU TPA
or from the communication-ALU RPA may
receive,
process and store in the local memory SR.

The access to the local memory SR is carried out via two registers twice indexed, in order to be able to access the usual data structures used in the communication technology within one system cycle. Thus said data switch DS avoids, as described above, the "bottle-neck" of a shared bus known from other communication-processors KP by letting the master ports (in the exemplary design two) access data at the same time via the different slave ports (in the exemplary design three). Therefore at the same time the memories may be read and written in parallel to the running operation, so that an industrial real-time Ethernet solution with network cycles and precision within a range of micro seconds may be obtained, which does not need any support of proprietary hardware components or ASICs. This also applies for the optimization and adjustment of the real-time transfer as well as for the complying with the demands of the application, of the system and the communication architecture, so that a constant data access may be provided from the management-level down to the field-level.

According to the invention said communication functions are not definitively defined, but rather are formed on the basis of freely programmable and communication function optimized communication ALUs KA. In the start phase said communication-processor KP configures said communication-controller KC matching and automatically loads the assigned to it firmware. Further said communication-processor KP comprises several freely programmable communication-controllers KC and with those may implement any combination of communication-standards.

As a preferred design of the invention beside the communication protocols said communication-processor KP may also carry out the application based on several freely programmable communication-controllers KC. According to the invention, as shown in a preferred design in FIG. 5, said freely-programmable communication-ALUs RPA, TPA, PEA work absolutely deterministically and automatically execute the synchronous drive functions without the downstream control unit CPU. Between synchronization times the measured values (position or motor current or phase voltage) transmitted via both encoder logics EL or a Sample-Hold-switch SH and an AD-converter AD or the correcting variables transmitted via a PWM modulator PWM are exchanged with the downstream CPU. Thus the interrupt latencies of the CPU will be ignored regarding the synchronization of the drive functions. According to the invention, a direct synchronization of drive functions, in particular the measuring of the position or the output of correcting variables, is provided on quick, deterministic and jitter-free communication connections, in particular real-time-Ethernet connections like for example PROFINET, POWERLINK, SERCOS-3, EtherCAT.

Figure 6:
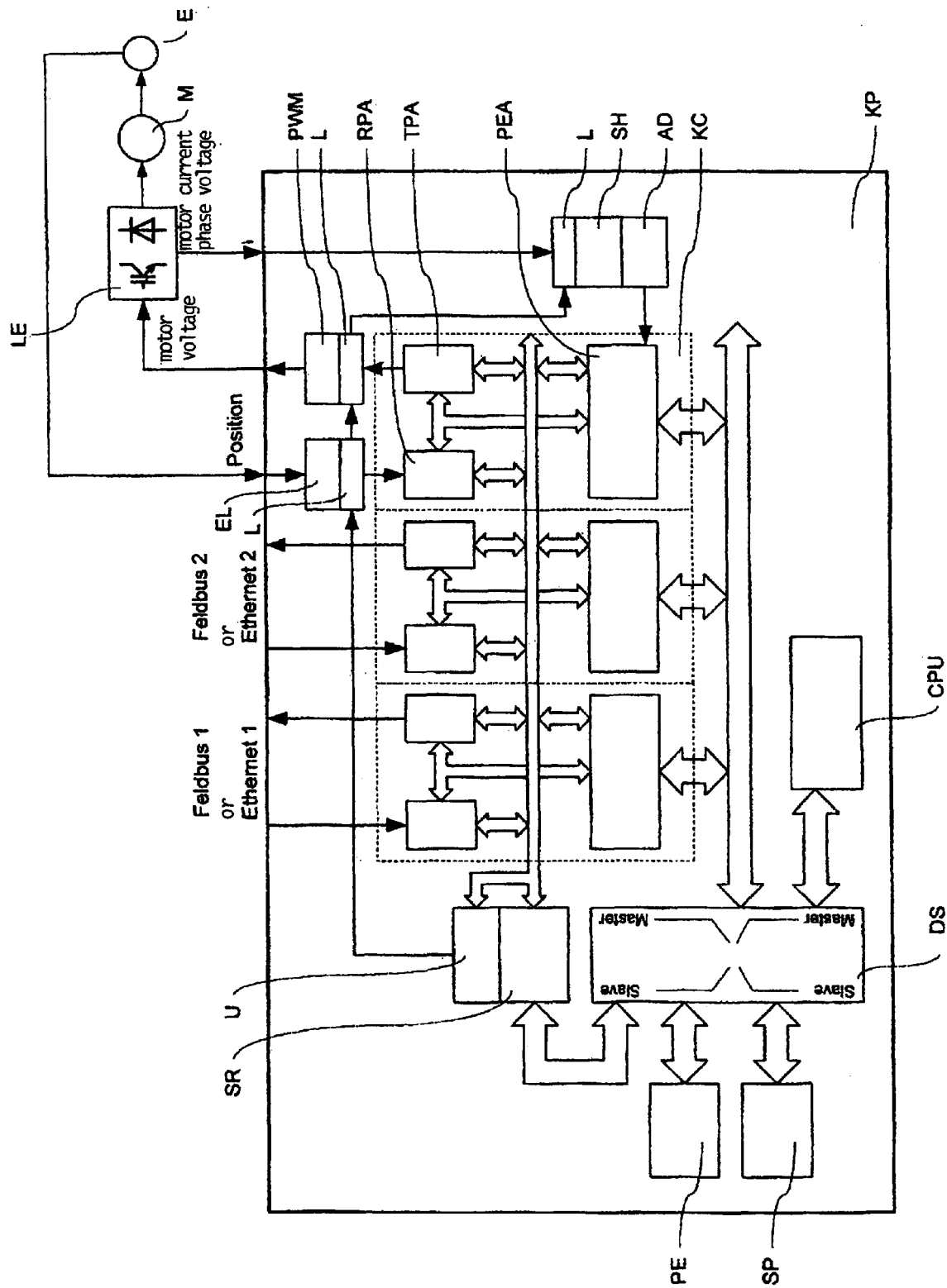
Figure 7:
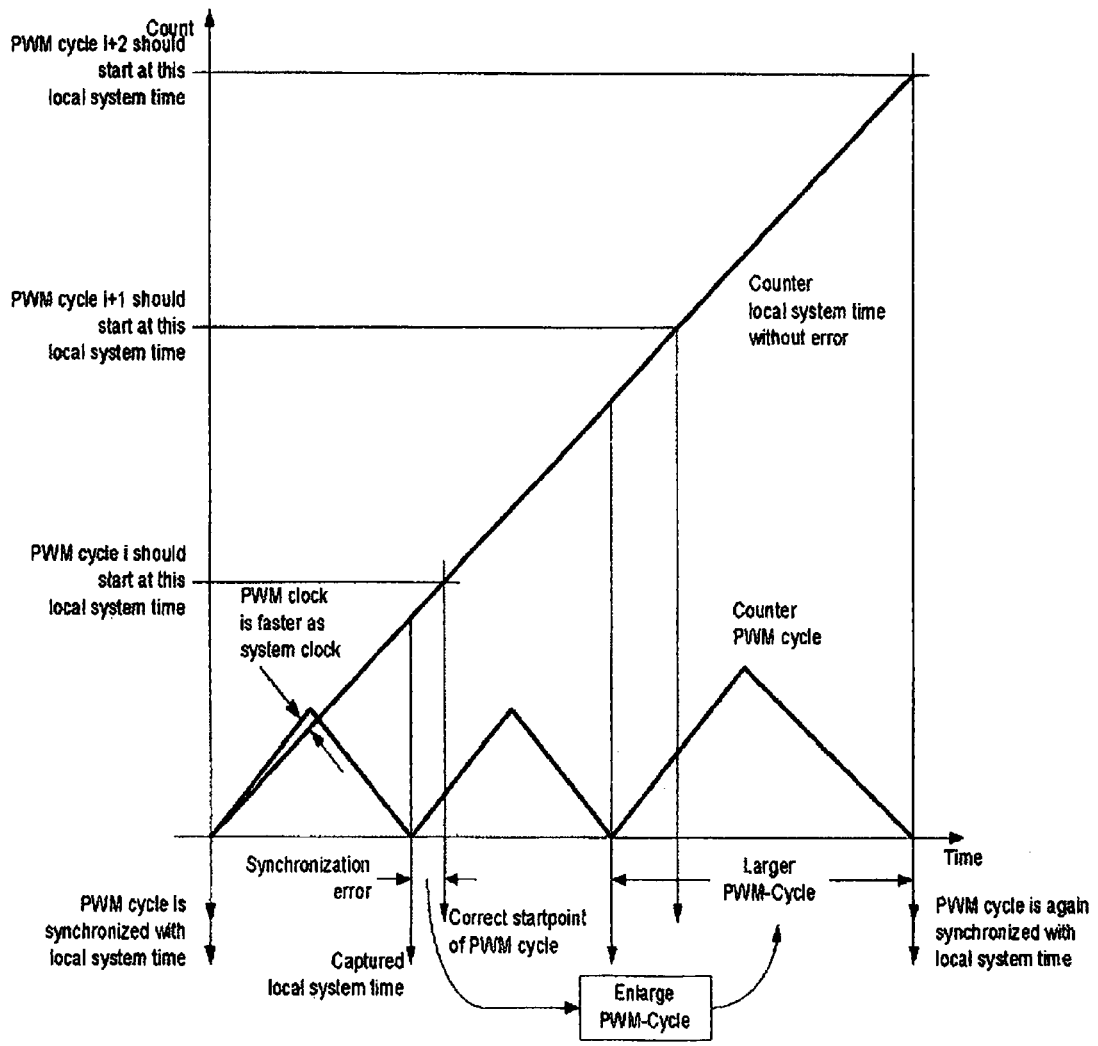

Alternatively the drive may maintain a local time, which may be synchronized via communication connections to local times of other drives on a shared system time within a programmable controller. At firmly defined points in time synchronous functions like measurement of position or output of motor current may then be carried out on each drive. Particularly difficult may be deemed that functions needed for this process run cyclically and that the entire cycle has to be synchronized in its cycle time and in its phase stage to the local time. A further design of the invention is shown in FIG. 6 and compared to the design shown in FIG. 5 this design provides additionally a local clock U and in the connection path of each of the communication-ALUs RPA, TPA, PEA a latch L is arranged. At the start point of cyclically running control functions the synchronized local time will be stored in said latch L, by computing the difference with the stored time in said latch L at the last start point the cycle time is measured based on the local time U and finally by enlarging or reducing the current cycle time, said cycle time is kept constantly and in a firm phase position. The entire cycle is then synchronized in its cycle time as well as in its phase position to the local time, as this can be learned directly from the time diagram shown in FIG. 7. According to the invention a direct synchronization of cyclic drive functions, in particular the measuring of the position or the output of correcting variables, to a local system time is permitted, said system time being able to be readjusted by appropriate protocols, in particular IEEE 1588, to obtain a synchronism within the automation system.

Even if the design of the invention is primarily described for the application in the automation technology, in particular for drive functions, (including an universal communication-platform for barcode- and identification systems, intelligent EAs, Low-Cost-drives, SPSs or machine terminals), the application of the method and apparatus may also be conceivable in other communication networks with corresponding network transitions. Standard and safety functions may be combined within a system without retroactive effects through an intelligent interlocking of both said functions. The modularity of said systems provides a high user-flexibility for customized, always easily expandable solutions and also permits a migration. This may be explained by the fact that according to the invention the concept is based on already given prerequisites of communication networks or systems/facilities (also for switched connections) thus permitting the easy adaptation to particular circumstances and the migration of the unchanged invention or of the basic concept. For example, according to the invention the method permits a cost-efficient design of bus users with individual interactive communication, said bus users being suitable for optional networking via optional wireless or wire networks or telecommunication networks (for example UTRAN UMTS Terrestrial Radio Access Network). The iteratively running process of the network management service, in particular regarding the dialog, comprises all usefully occurring dialog elements (for example initialization, configuration, start and stop of bus users (devices) or programs, communication protocols), which are backed up correspondingly, and may also be applied in particular regarding inhomogeneous structures and permits a dialog monitoring with inclusion of the bus users and the dialog server in the telecommunication network. Thus for example an access to data, parameters, functions is permitted on each bus user, said access being carried out of any location via internet as well as a standard, device-independent fault clearance. Furthermore in a preferable way the initializing of new and the exchange of faulty devices may be carried out through plug & play and the flexible communication mechanisms permit the simple use in many application requirements and system architectures. According to the invention for example not only master/slave-systems, but also distributed control functions requiring at least partly non-hierarchical network architecture with a permeability into both directions, may be implemented. As a further design of the invention for example routing-functionalities (also as LCR Least Cost Router) may be installed in the dialog server for TCP/IP and SPX/IPX.

I claim:

1. A method for data communication via a serial data bus between bus users of an open automation system with distributed control functions, wherein the bus users include a communication processor (KP) having at least a communication-controller (KC) that cooperates with a superior control unit that is external to or integrated in said communication processor (KP), the method comprising the steps of:
   a) providing the communication-controller (KC) with at least a first freely-programmable communication-ALU, a second freely-programmable communication-ALU and a third freely-programmable communication-ALU;
   b) encoding several commands on a command code for the programmable communication-ALUs, the command code being optimized for particular communication functions; and
   c) arranging logic function blocks in parallel in said programmable communication-ALUs, the logic function blocks carrying out particular communication functions, wherein the communication functions are not definitively defined, but rather the communication functions are formed on a basis of the freely-programmable communication-ALUs, wherein the first freely-programmable communication-ALU comprises a Receiving Processing ALU (RPA) being responsible for decoding a received bit- or nibble (half a byte) serial data stream in accordance with a transfer rate and converting said data stream into a parallel form, wherein the second freely-programmable communication-ALU comprises a Transmit Processing ALU (TPA) being responsible for encoding data out of the parallel form into a bit- or nibble serial data stream and feeding said data into a line with the correct transfer rate, and wherein the third freely-programmable communication-ALU comprises a Protocol Execution ALU (PEA) being responsible for controlling an input- and output sequence of a related data packet so that several commands are carried out in a system cycle with execution of transitions between various networks.

2. The method of claim 1, wherein communication is carried out in two steps, the communication function being assigned to two of the freely-programmable communication ALUs in a first step, wherein the first freely-programmable communication-ALU is optimized for receiving and decoding the bit- or nibble (half a byte) serial data stream, and for parallel conversion of said serial data stream into a byte-, word- or double-word-form, and the second freely-programmable communication-ALU is optimized for the serial conversion of the byte-, word- or double-word-form into the bit- or nibble serial data, and for encoding and transmitting the serial data stream, the communicating function being further assigned to the third freely-programmable communication-ALU in a second step, wherein the third freely-programmable communication-ALU provides a monitoring logic to monitor a plurality of possible events or combinations of possible events at a same time and which, in case of an event occurrence, starts an assigned program code within one system cycle.

3. The method of claim 2, wherein the superior control unit is integrated in a circuit together with one or all of said freely-programmable communication-ALUs, said circuit providing a dual-port memory for connection to an external control unit, or wherein the superior control unit of the circuit carries out an entire application and said circuit then provides an internal system bus formed as an extension bus to connect an external memory and periphery blocks, wherein, for both operation modes, same signals are used which are switched per software.

4. The method of claim 3, wherein the freely-programmable communication ALUs are coupled to further freely-programmable communication-ALUs via a shared register set for serial/parallel- or parallel/serial conversion, the further freely-programmable communication ALUs permitting write and read access for all users at a same time, wherein, regarding writing, a last value is valid.

5. The method of claim 4, wherein a register set and a dual-port memory of the freely-programmable communication-ALUs is read and written by the superior control unit in parallel to a running operation mode.

6. The method of claim 4, wherein the communication-controller comprising at least one freely-programmable communication-ALU is coupled to the superior control unit via a DMA-controller, a dual-port memory, and a shared register.

7. The method of claim 2, wherein the third freely-programmable communication ALU monitors, in parallel, a plurality of particular events or a transfer of particular data from the first freely-programmable communication ALU to the second freely-programmable communication ALU, to the superior control unit, a lapse of time, particular counter readings, or setting of particular status-bits.

8. The method of claim 1, wherein a very wide or a 64 bit wide command code is used, on which several commands, logical operations, program jumps, setting and deleting of bits, incrementing and decrementing of counters, data transfer and operation of special function registers, are encoded, said commands being processed in parallel within one system cycle.

9. A device for data communication via a serial data bus between bus users of an open automation system having distributed control functions, the device comprising:
  a communication processor (KP) having at least a communication controller (KC) that cooperates with a superior control unit that is external to or integrated in said communication processor (KP) and having at least a first freely-programmable communication-ALU, a second freely-programmable communication-ALU and a third freely-programmable communication-ALU;
  a command code on which several commands are encoded and which is communication function optimized; and
  a parallel arrangement of at least two logic function blocks executing particular communication functions in said freely-programmable communication ALUs, wherein said communication functions are not definitively defined, but rather the communication functions are formed on a basis of the freely-programmable communication-ALUs, wherein the first freely-programmable communication-ALU comprises a Receiving Processing ALU (RPA) being responsible for decoding a received bit- or nibble (half a byte) serial data stream in accordance with a transfer rate and converting said data stream into a parallel form, wherein the second freely-programmable communication-ALU comprises a Transmit Processing ALU (TPA) being responsible for encoding data out of the parallel form into a bit- or nibble serial data stream and feeding said data into a line with the correct transfer rate, and wherein the third freely-programmable communication-ALU comprises a Protocol Execution ALU (PEA) being responsible for controlling an input- and output sequence of a related data packet so that several commands are carried out in a system cycle with execution of transitions between various networks.

10. The device of claim 9, wherein said arranged in parallel logic function blocks comprise at least one shifting register, at least one counter, and at least one comparator which evaluate serial data and set status-bits in flags depending on predetermined values, and at least one CRC-generator which, upon command of said freely-programmable communication-ALUs, includes the serial data when computing a CRC-polynom for serial/parallel- or parallel/serial-conversion of one up to 32 bit wide data and encoding and decoding of said data.

11. The device of claim 9, wherein, for serial/parallel- or parallel/serial-conversion, said freely-programmable communication-ALUs are coupled to further freely-programmable communication-ALUs via FIFOs and additionally via command- and status registers or wherein said further freely-programmable communication-ALUs are coupled via a shared register set, said further freely-programmable communication ALUs permitting write and read access for all users at a same time, wherein regarding writing, a last value is valid.

12. The device of claim 9, wherein at least one of said freely-programmable communication ALUs is connected to said superior control unit via a DMA-controller and/or a dual-port memory.

13. The device of claim 12, wherein a host interface unit is provided with a host control unit connected to address-, data-, control bus lines, said host control unit switching over between an extension bus, for a connection of memory and periphery blocks, and said dual-port memory for connection of a further superior control unit.

14. An apparatus with a flexible communication structure or a programmable controller, the apparatus comprising:
  a communication processor (KP having at least one freely-programmable communication-controller, cooperating with a superior control unit that is external to or integrated in said communication processor (KP);
  at least a first freely-programmable communication-ALU, a second freely-programmable communication-ALU and a third freely-programmable communication-ALU integrated in said communication-controller, wherein the first freely-programmable communication ALU comprises a Receiving Processing ALU (RPA) being responsible for decoding a received bit- or nibble (half a byte) serial data stream in accordance with a transfer rate and converting said data stream into a parallel form, the second freely-programmable communication-ALU comprises a Transmit Processing ALU (TPA) being responsible for encoding data out of the parallel form into a bit- or nibble serial data stream and feeding said data stream into a line with the correct transfer rate, and the third freely-programmable communication-ALU comprises a Protocol Execution ALU (PEA) being responsible for controlling the input- and output sequence of a related data packet; and
  an exchangeable, physical interface connected to said communication-controller via signal lines for transmission of an identification code, control data, input data, and output data.

15. The apparatus of claim 14, wherein a communication processor comprises more than three freely programmable communication-controllers.

16. The apparatus of claim 14, wherein said physical interface is a printed circuit forming a connecting plug of a communication network.

17. The apparatus of claim 14, wherein the physical interface, with a connecting plug of a communication network, is designed as an integrated unit.

18. The apparatus of claim 14, wherein said communication processor processes both application and transmission protocol.

19. A method for configuration of an apparatus with a flexible communication structure having a communication processor (KP) with at least one communication controller in which at least one freely-programmable communication-ALU is integrated and with at least one physical interface, the method comprising the steps of:
  forming communication functions in a manner which is not definitively defined, but rather the communication functions are formed on a basis of freely-programmable and communication function optimized communication ALUs;
  decoding a received bit- or nibble (half a byte) serial data stream in accordance with a transfer rate and converting said data stream into a parallel form by a Receiving Processing ALU (RPA) of a first freely-programmable communication ALU;

encoding data out of the parallel form into a bit- or nibble serial data stream and feeding said data stream into a line with the correct transfer rate by a Transmit Processing ALU (TPA) of a second freely-programmable communication-ALU;

controlling the input- and output sequence of a related data packet by a Protocol Execution ALU (PEA) of a third freely-programmable communication-ALU;

transmitting, during a start phase and using the physical interface, an identification code to said communication controller via a signal line; and automatically executing a proper configuration using the communication controller to load assigned software into the freely-programmable communication-ALU.

* * * * *